(12) United States Patent
Mueller

(10) Patent No.: US 10,427,273 B2
(45) Date of Patent: Oct. 1, 2019

(54) METHOD FOR THE DRESSING OF A MULTI-THREAD GRINDING WORM BY MEANS OF A DRESSING ROLL

(71) Applicants: KAPP Werkzeugmaschinen GmbH, Coburg (DE); NILES Werkzeugmaschinen GmbH, Berlin (DE)

(72) Inventor: Frank Mueller, Meeder (DE)

(73) Assignees: KAPP WERKZEUGMASCHINEN GMBH, Coburg (DE); NILES WERKZEUGMASCHINEN GMBH, Berlin (DE)

(*) Notice: Subject to any disclaimer, the term of this patent is extended or adjusted under 35 U.S.C. 154(b) by 179 days.

(21) Appl. No.: 15/608,190

(22) Filed: May 30, 2017

(65) Prior Publication Data

US 2017/0341205 A1  Nov. 30, 2017

(30) Foreign Application Priority Data

May 31, 2016 (DE) .................. 10 2016 006 673

(51) Int. Cl.
*B24B 53/075* (2006.01)
*B23F 21/02* (2006.01)
(Continued)

(52) U.S. Cl.
CPC .......... *B24B 53/075* (2013.01); *B23F 21/026* (2013.01); *B24B 53/085* (2013.01); *B23F 5/04* (2013.01); *B23F 23/1225* (2013.01)

(58) Field of Classification Search
CPC ..... B24B 53/07; B24B 53/053; B24B 53/062; B24B 53/075; B24B 53/082;
(Continued)

(56) References Cited

U.S. PATENT DOCUMENTS 5,339,794 A * 8/1994 Thyssen ............... B24B 53/085
125/11.04
7,121,930 B2 10/2006 Thyssen
(Continued)

FOREIGN PATENT DOCUMENTS

DE 3235790 A1 4/1983
DE 4339041 A1 6/1994
(Continued)

Primary Examiner — Joseph J Hail
Assistant Examiner — Timothy Brian Brady
(74) Attorney, Agent, or Firm — Lucas & Mercanti, LLP

(57) ABSTRACT

A method for the dressing of a multi-thread grinding worm by a dressing roll, wherein the grinding worm has at least two screw channels which are arranged parallel to another, which screw channels extend helically around an axis of the grinding worm and wherein the dressing roll has at least two adjacent dressing profiles which are arranged along an axis of the dressing roll, wherein the dressing profiles of the dressing roll are guided simultaneously through adjacent screw channels of the grinding worm during the dressing of the grinding worm. To improve the precision of the dressing the method includes the steps: a) Execution of a first partial dressing process at which the dressing profiles of the dressing roll are guided simultaneously through first adjacent screw channels of the grinding worm; b) Execution of at least one second partial dressing process at which the dressing profiles of the dressing roll are guided simultaneously through second adjacent screw channels of the grinding worm, wherein the second adjacent screw channels are, compared with step a), offset in the direction of the axis of the grinding worm by at least one screw channel of the grinding worm.

8 Claims, 2 Drawing Sheets

(51) Int. Cl.
  *B24B 53/085* (2006.01)
  *B23F 23/12* (2006.01)
  *B23F 5/04* (2006.01)

(58) Field of Classification Search
  CPC ....... B24B 53/083; B24B 53/085; B23F 5/04;
  B23F 19/12; B23F 19/125; B23F 21/02;
  B23F 21/026; B23F 23/1225
  USPC ............................ 451/47, 56, 147, 253, 443
  See application file for complete search history.

(56) References Cited

U.S. PATENT DOCUMENTS

| | | | |
|---|---|---|---|
| 9,114,466 B2 | 8/2015 | Mueller | |
| 2005/0245176 A1* | 11/2005 | Thyssen | B24B 53/075 |
| | | | 451/56 |
| 2008/0264401 A1* | 10/2008 | Lopez | B24B 53/085 |
| | | | 125/11.03 |
| 2013/0090043 A1* | 4/2013 | Mueller | B23F 23/1225 |
| | | | 451/47 |
| 2018/0161896 A1* | 6/2018 | Wuerfel | B23F 23/1225 |

FOREIGN PATENT DOCUMENTS

| | | |
|---|---|---|
| DE | 102004020947 A1 | 11/2005 |
| DE | 102008053021 A1 | 4/2010 |
| DE | 102012002126 A1 | 8/2013 |
| EP | 2848348 A2 | 3/2015 |
| GB | 1502716 A | 3/1978 |

\* cited by examiner

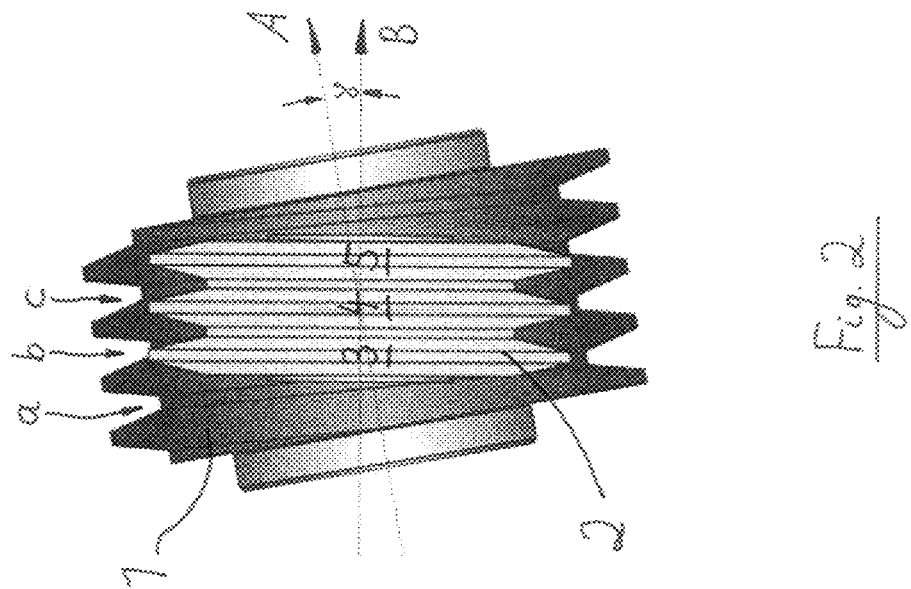
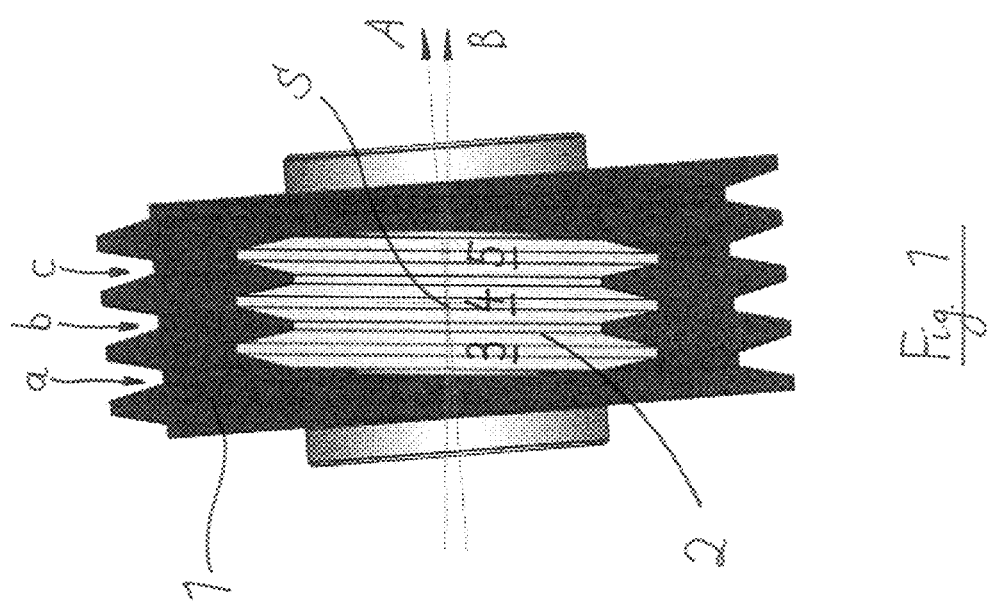

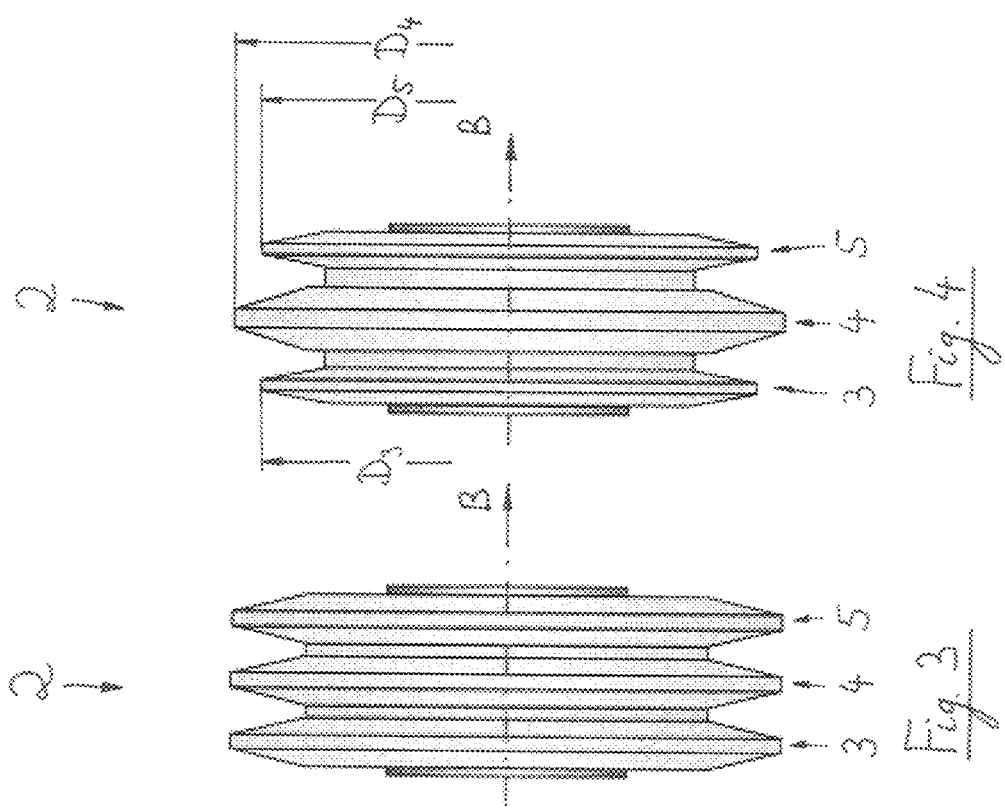

METHOD FOR THE DRESSING OF A MULTI-THREAD GRINDING WORM BY MEANS OF A DRESSING ROLL

CROSS-REFERENCE TO RELATED APPLICATIONS

The present application claims priority of DE 10 2016 006 673.3, filed May 31, 2016, the priority of this application is hereby claimed and this application is incorporated herein by reference.

BACKGROUND OF THE INVENTION

The invention relates to a method for the dressing of a multi-thread grinding worm by means of a dressing roll, wherein the grinding worm has at least two screw channels which are arranged parallel to another, which screw channels extend helically around an axis of the grinding worm and wherein the dressing roll has at least two adjacent dressing profiles which are arranged along an axis of the dressing roll, wherein the dressing profiles of the dressing roll are guided simultaneously through adjacent screw channels of the grinding worm during the dressing of the grinding worm.

Normally, a dressable multi-thread grinding worm is used at the machining of gearings, cycloids or rotor profiles with generative tools. In turn the dressing of the grinding worm takes place with a one or multi groove dressing roll.

The dressing with a single groove dressing roll (single row dressing) takes place by a plurality of single infeeds with one respective machining stroke in each channel and is repeated after parting (i.e. after the profile of the dressing roll is inserted in the next channel of the multi-thread grinding worm) in each channel of the grinding worm.

The use of a multi-groove dressing roll achieves a time advantage compared with a single-groove roll because during dressing several threads (i.e. grooves) of the grinding worm can be dressed simultaneously and so the parting in the single threads of the grinding worm can be reduced or can be omitted at all.

Due to cost reasons always a time-optimized dressing is aimed for. For example if a 3-grooved dressing tool (dressing roll) is used for the production of a 3-thread grinding worm the partition process is omitted totally because all three threads or grooves of the grinding worm can be dressed simultaneously. If the number of threads is higher than the number of grooves of the dressing roll is must be parted accordingly to dress all threads of the grinding worm.

It is the aim of the dressing that finally a grinding worm is obtained which is free of failures as possible at which all threads are distributed exact equally around the circumference and do not differ from another with respect to their geometry.

The dressing tool is designed in such a manner that all grooves (i.e. all dressing profiles) create the same geometry at or in the worm thread. Due to the design of the multi-groove dressing roll for a predetermined tool diameter, thus due to the given fixed geometry, due to the defects in manufacturing of the dressing roll and due to the fact that not all threads of the grinding worm are dressed with the same groove (i.e. with the same dressing profile) geometry defects in the grinding worm are created, thus in the grinding tool. Those defects are transferred systematically at first to the tool and then to the work piece at the subsequent grinding process.

The dressing occurs normally not axially parallel but in the lead angle of the grinding worm. Because the lead angle changes with smaller becoming diameter of the grinding worm also the created geometry of the grinding worm is changing due to the fixed geometry of the dressing tool and due to the fact that not all grooves (dressing profiles) of the dressing roll are arranged in the pivot center of the grinding worm.

This is substantially the reason that multi-groove dressing tools cannot be used for all module ranges of a gearing. A bigger module means a bigger lead angle; thus the grooves of the dressing roll, which are not arranged in the pivot center of the grinding worm, create bigger deviations.

The single-groove dressing tool creates always a higher quality than the multi-groove dressing but requires more time for dressing and thus higher costs.

SUMMARY OF THE INVENTION

It is the object of the invention to propose a method of the generic kind for the dressing of a grinding worm by which the precision of the dressing can be improved. So, an increase of quality should be obtained, wherein the time for dressing should be as short as possible. Furthermore it is aimed for to increase the field of application of existing dressing tools and especially also to dress grinding worms which are provided for bigger toothing module ranges.

The solution of this object by the invention proposes a method which comprises the steps:

a) Execution of a first partial dressing process at which the dressing profiles of the dressing roll are guided simultaneously through first adjacent screw channels of the grinding worm;

b) Execution of at least one second partial dressing process at which the dressing profiles of the dressing roll are guided simultaneously through second adjacent screw channels of the grinding worm, wherein the second adjacent screw channels are, compared with step a), offset in the direction of the axis of the grinding worm by at least one screw channel of the grinding worm.

At the execution of the mentioned step b) the dressing profiles of the dressing roll are preferably guided simultaneously through second adjacent screw channels of the grinding worm, wherein the second adjacent screw channels are, compared with step a), offset in the direction of the axis of the grinding worm by exactly one screw channel of the grinding worm. But it is also possible that the mentioned offset is carried out by several screw channels of the grinding worm.

After the execution of the above step b) at least one further partial dressing process can be carried out at which the dressing profiles of the dressing roll are guided simultaneously through further adjacent screw channels of the grinding worm, wherein the further adjacent screw channels are, compared with above step b), offset in the direction of the axis of the grinding worm by at least one, preferably by exactly one screw channel of the grinding worm.

At the execution of above steps a) and b) preferably at simultaneous rotation of the grinding worm and of the dressing roll around their respective axes a predetermined (namely constant) radial distance is kept between the grinding worm and the dressing roll. In this case it is preferably provided that the radial distance between the grinding worm and the dressing roll is equal at the execution of above steps a) and b).

At the execution of above steps a) and b) a pivoting angle can be set between the axis of the grinding worm and the axis of the dressing roll.

According to a preferred embodiment a dressing roll is used which has a dressing profile with a first diameter and at least one dressing profile with a second diameter which are arranged adjacent to another, wherein the first diameter is bigger than the second diameter. Furthermore, it can be provided that alternatively or additively to the reduced diameter also the width of the dressing profile (in the direction of the axis of the dressing roll) is reduced; also the shape of the dressing profile can be modified. This allows the possibility to realize also very different modules of the gearing which has to be ground.

Thereby, it can be provided that a dressing roll is used which has a dressing profile with first diameter which is flanked on both sides by one dressing profile with second diameter.

The second diameter is preferably between 99.0% and 99.9% of the first diameter.

After the execution of the first partial dressing process according above step a) further partial dressing processes according above step b) can be carried out, wherein the dressing profile with the first diameter is guided out through all screw channels of the grinding worm.

Accordingly, the proposed concept provides the possibility after the actual dressing and out of meshing of dressing tool and grinding worm to rotate and to shift respectively the grinding worm by one or more partitions (channels) so that at the subsequent dressing stroke, which preferably takes place without selective (radial) infeed, other grooves of the dressing tools come into contact with the channels of the grinding worm.

Hereby, the advantage is obtained that defects in manufacturing of the dressing roll or defects which arise by the dressing process itself are so transmitted to several or even to all channels of the grinding tool. This causes that the deviations among the channels are minimized or eventually even totally eliminated.

As normally a dressing process consists of a plurality of single infeeds a time benefit is obtained despite the subsequent rotation and the additional dressing strokes compared with the dressing with a single-groove dressing tool. In total the dressing becomes so more economical.

Multi-groove dressing tools are designed in such a manner that the created profiles at the grinding worm are as equal as possible. However, this can theoretically match only for a single grinding worm diameter and lead angel respectively.

At a change of the grinding worm diameter the lead angle changes; by this deviations arise at the created worm geometry. The biggest deviations are created by the outermost grooves of the dressing roll (which have the biggest distance from the center of the dressing roll) because those have the biggest distance from the pivoting point of the grinding worm. Those deviations can possibly become so big that indeed the subsequent levelling (see above step b) of the screw channels takes care for an even geometry in all channels, that however the deviations from the set geometry are so big that the workpiece cannot be ground with sufficient quality.

In such a case a dressing tool can be employed at which only the center groove and gap respectively (i.e. the center dressing profile) creates the desired target geometry. All other grooves (i.e. dressing profiles) are targeted reduced in the diameter and if applicable reduced in the width in the direction of the axis of the dressing roll and so recessed at the shaping flanks of the dressing tool and let thus sufficient material to create the desired target geometry at the end of the dressing by levelling of each channel.

In fact it is detrimental here that now each screw channel must be machined again for the levelling. However the advantage predominates that now also grinding worms with a big module can be dressed in a multi-groove manner.

So, the invention provides a solution on the basis of an offset of gaps at a multi-groove dressing of a worm-shaped machining tool with standard tools (dressing rolls) and with a special tool (see the below mentioned embodiment).

Thus, after the actual dressing process of the grinding worm with the dressing roll according to the invention an offset of gaps of the dressing tool occurs in (at least) one subsequent gap and in a subsequent channel of the grinding worm respectively. If the number of threads of the grinding worm is bigger than the number of grooves of the dressing roll it is not mandatory that a shifting takes place in the subsequent channel; it can be shifted in one or any subsequent channels.

The invention provides thus a solution which can be realised by software which improves the dressing result at the use of multi-groove dressing tools especially with respect to the partition result and with respect of the profile shape at a worm-shaped tool with more than one thread.

Insofar a multi-groove dressing of a worm-shaped tool is proposed which is used preferably for the machining of gearings, cycloids or rotor profiles.

Beneficially an increase of the quality is obtained by keeping the saving of time.

It is also very beneficial that the proposed method can also be employed at bigger modules and thus an increase of the field of applications is obtained.

Thus, a substantial increase of the quality is obtained at only a small loss of time compared with the conventional multi-groove dressing.

Especially, the use of multi-groove dressing tools is possible also for bigger modules because deviations can be minimized or even totally eliminated by the proposed method.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

FIG. 1 shows schematically the side view of a grinding worm with big diameter which is dressed with a dressing roll, FIG. 2 shows in the depiction of FIG. 1 a grinding worm with a smaller diameter which is dressed with the dressing roll, FIG. 3 shows a dressing roll according to a first embodiment and FIG. 4 shows a dressing roll according to a second embodiment.

DETAILED DESCRIPTION OF THE INVENTION

In FIGS. 1 and 2 the dressing process of a grinding worm 1 with two different diameters by means of a dressing roll 2 is illustrated. The grinding worm 1 is designed as multi-thread worm so that it has several screw channels a, b, c, . . . which extend parallel to another helically around the axis A of the grinding worm.

The dressing is carried out by means of the dressing roll 2 which has in the present embodiment three adjacent dressing profiles 3, 4 and 5 (dressing disks) which each are designed as disk-shaped bodies. Thereby, the three dressing profiles 3, 4, 5 are arranged adjacent side by side along the axis B of the dressing roll.

As can be seen from the two FIGS. 1 and 2 for two different diameters of the grinding worm 1 the axis A of the grinding worm and the axis B of the dressing roll draw a pivoting angle γ during dressing. In the depicted side view of the grinding worm 1 and of the dressing roll 2 the axis A of the grinding worm and the axis B of the dressing roll intersect in a point S of pivoting.

In general the dressing of the grinding worm 1 by means of the dressing roll 2 takes place in such a manner that the dressing profiles 3, 4, 5 of the dressing roll 2 are simultaneously guided through the adjacent screw channels a, b, c, . . . of the grinding worm 1. Here, the grinding worm 1 as well as the dressing roll 2 rotate around their respective axes A, B.

Now it is essential that at first a first partial dressing process is carried out at which the dressing profiles 3, 4, 5 of the dressing roll 2 are guided simultaneously through first adjacent screw channels a, b, c of the grinding worm 1. If this is done the grinding worm 1 and the dressing roll 2 are at first be brought out of mesh and subsequently be brought in mesh again in such a manner that a second partial dressing process can be carried out at which the dressing profiles 3, 4, 5 of the dressing roll 2 are guided simultaneously through second adjacent screw channels b, c, . . . of the grinding worm 1. Thereby, it is provided that the second adjacent screw channels b, c, . . . are offset in the direction of the axis A of the grinding worm compared with the first partial dressing process by one or several screw channels of the grinding worm 1.

At this second partial dressing process the same radial distance between grinding worm 1 and dressing roll 2 is kept by which the defects of the dressing roll 2 which are transferred to the grinding worm 1 are minimized.

Thus, if for example at a 3-threaded grinding worm (as depicted) a 3-grooved dressing roll (as depicted) is employed and at the end of the dressing process additional twice a further partition takes place by each one thread (shifting in axial direction) and a dressing stroke without infeed is carried out then a uniform result is obtained at the grinding worm 1, comparable with the dressing of a single-groove dressing tool. Nevertheless, the time is not required for dressing as in the case of a single-groove dressing roll.

When comparing FIGS. 1 and 2 it can be seen that at smaller becoming diameter of the grinding worm 1 the pivoting angle γ becomes bigger. Due to this an increased deviation in the geometry would arise which is caused by the dressing profiles 3 and 5 which are further distanced from the point of pivoting S. This would be the case if the dressing roll 2 is designed in such a manner as shown in FIG. 3.

To work against this effect a solution can be provided as depicted in FIG. 4. Here it can be seen that the central dressing profile 4 has a first diameter D4 which is bigger than the second diameters D3 and D5 of the two dressing profiles 3 and 5 which flank the dressing profile 4 at both sides. Accordingly the width of the dressing profiles 3, 5 can be reduced in the direction of the axis B of the dressing roll. The mentioned reduction of the diameter and the width respectively is thereby in such a magnitude that preferably between 99.0% and 99.9% of the respective values of the central dressing profile 4 are given.

By this it becomes possible to realize gearing modules in a broad range, wherefore it becomes necessary then however to guide the dressing profile 4 through all screw channels a, b, c, . . . of the grinding worm 1 to carry out the dressing process precisely.

While specific embodiments of the invention have been shown and described in detail to illustrate the inventive principles, it will be understood that the invention may be embodied otherwise without departing from such principles.

I claim:

1. A method for the dressing of a multi-thread grinding worm by means of a dressing roll, wherein the grinding worm has at least two screw channels which are arranged parallel to another, which screw channels extend helically around an axis of the grinding worm and wherein the dressing roll has at least two adjacent dressing profiles which are arranged along an axis of the dressing roll, wherein the dressing profiles of the dressing roll are guided simultaneously through adjacent screw channels of the grinding worm during the dressing of the grinding worm, wherein the method comprises the steps:
    a) execution of a first partial dressing process at which the dressing profiles of the dressing roll are guided simultaneously through a first set of adjacent screw channels of the at least two screw channels of the grinding worm;
    b) execution of at least one second partial dressing process at which the dressing profiles of the dressing roll are guided simultaneously through a second set of adjacent screw channels of the at least two screw channels of the grinding worm, wherein the second set adjacent screw channels are offset in the direction of the axis of the grinding worm by at least one screw channel of the grinding worm relative to the first set of adjacent screw channels,
    wherein the dressing roll has a dressing profile with a first diameter and at least one dressing profile with a second diameter which are arranged adjacent to another, wherein the first diameter is bigger than the second diameter, and a width of the dressing profile with the second diameter in the direction of the axis of the dressing roll is smaller than a width of the dressing profile with the first diameter, wherein the dressing roll has the dressing profile with the first diameter which is flanked on both sides by the dressing profile with the second diameter.

2. The method according to claim 1, wherein at the execution of step b) the dressing profiles of the dressing roll are guided simultaneously through the second set of adjacent screw channels of the grinding worm, wherein the second set of adjacent screw channels are offset in the direction of the axis of the grinding worm by exactly one screw channel of the grinding worm relative to the first set of adjacent screw channels.

3. The method according to claim 1, wherein after the execution of step b) at least one further partial dressing process is carried out at which the dressing profiles of the dressing roll are guided simultaneously through a further set of adjacent screw channels of the grinding worm, wherein the further set of adjacent screw channels are offset in the direction of the axis of the grinding worm by at least one screw channel of the grinding worm relative to the second set of adjacent screw channels.

4. The method according to claim 1, wherein at the execution of steps a) and b) at simultaneous rotation of the grinding worm and of the dressing roll around their respective axes a predetermined radial distance is kept between the grinding worm and the dressing roll.

5. The method according to claim 4, wherein the radial distance between the grinding worm and the dressing roll is equal at the execution of steps a) and b).

6. The method according to claim 1, wherein at the execution of steps a) and b) a pivoting angle is set between the axis of the grinding worm and the axis of the dressing roll.

7. The method according to claim 1, wherein the second diameter is between 99.0% and 99.9% of the first diameter.

8. The method according to claim 1, wherein the at least one partial dressing process according step b) is performed a number of times so that the dressing profile with the first diameter is guided through each of the at least two screw channels of the grinding worm.

* * * * *